United States Patent [19]

Oswald

[11] Patent Number: 4,729,933
[45] Date of Patent: Mar. 8, 1988

[54] SEALED ABSORBED ELECTROLYTE BATTERY WITH BULGE COMPENSATING END CELLS

[75] Inventor: Thomas L. Oswald, Roseville, Minn.

[73] Assignee: GNB Incorporated, Mendota Heights, Minn.

[21] Appl. No.: 17,282

[22] Filed: Feb. 11, 1987

[51] Int. Cl.[4] .............................................. H01M 2/02
[52] U.S. Cl. ...................................... 429/59; 429/163; 429/176; 429/66
[58] Field of Search ....................... 429/57, 58, 59, 60, 429/66, 176, 163

[56] References Cited

U.S. PATENT DOCUMENTS

| 695,710 | 3/1902 | Entz . | |
|---|---|---|---|
| 1,379,088 | 5/1921 | Edison | 429/66 |
| 1,785,202 | 12/1930 | Lubeck . | |
| 2,626,295 | 1/1953 | MacFarland . | |
| 2,812,376 | 11/1957 | Yardney | 429/66 |
| 3,048,645 | 8/1962 | Ruben . | |
| 3,288,642 | 11/1966 | Kordesch . | |
| 3,390,017 | 6/1968 | Hennigan . | |
| 3,391,029 | 7/1968 | Orsino . | |
| 4,004,068 | 1/1977 | Briggs . | |
| 4,200,685 | 4/1980 | Klootwyk et al. | 429/176 |
| 4,336,314 | 6/1982 | Yonezu . | |

FOREIGN PATENT DOCUMENTS

| 0494051 | 8/1950 | Belgium | 429/57 |
|---|---|---|---|
| 0855812 | 12/1960 | United Kingdom | 429/66 |

Primary Examiner—Donald L. Walton
Attorney, Agent, or Firm—Augustus J. Hipp; Paul J. Korniczky

[57] ABSTRACT

A battery structure arranged to avoid the inefficiency problems which normally accompany container bulging in conventional absorbed electrolyte batteries such as sealed lead-acid batteries. The battery container is separated by partition walls into a plurality of working cells into which are closely fitted conventional stacks of plates and separators. The partition walls hold the plates and separators in intimate contact necessary for proper operation of the battery. Bulge compensating end cells are provided at either end of the battery between the working cells and the container end walls to accommodate pressure variations during battery operation. Compression means associated with the bulge compensating end cells maintains the plates and separators in intimate contact to maintain battery efficiency while permitting the container end walls to bulge.

9 Claims, 10 Drawing Figures

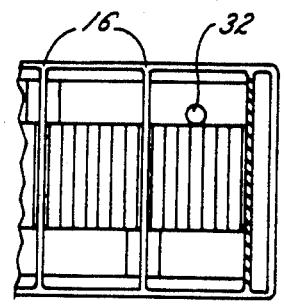
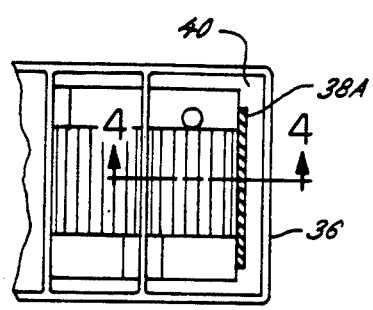
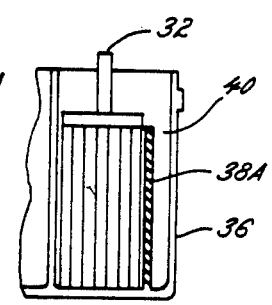
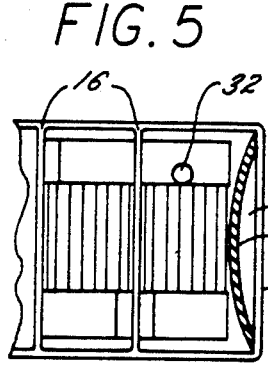
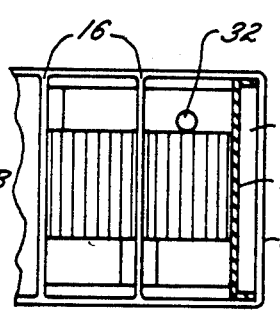
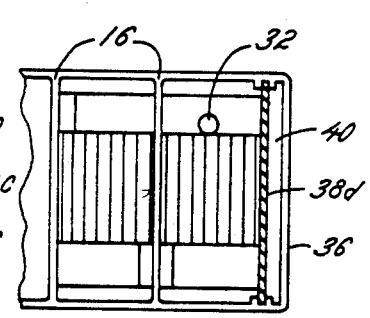
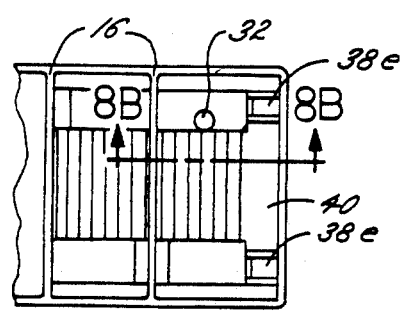
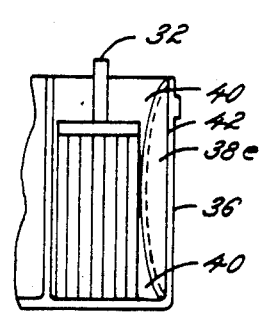
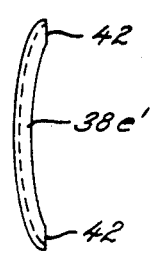

SEALED ABSORBED ELECTROLYTE BATTERY WITH BULGE COMPENSATING END CELLS

BACKGROUND OF THE INVENTION

This invention relates generally to absorbed electrolyte batteries and, more particularly, to a sealed battery adapted to compensate for internal pressure variations.

A well known example of such batteries is the sealed lead-acid type although other types of absorbed electrolyte batteries are available, such as the nickel-cadmium configuration. Sealed lead-acid batteries, as an example of the type under consideration, typically have certain features in common. A common gas manifold system interconnects all cells and a venting device is normally provided to prevent excess gas pressure buildup within the battery. The battery elements are housed within a rectangular container which is divided by partition walls into a series of cells. An electrode stack is closely fitted within each cell. The electrode stacks comprise alternate positive and negative plates with separators interposed between the positive and negative plates.

In sealed lead-acid batteries, there is substantially no free unabsorbed electrolyte in the cells. The major portion of the electrolyte is restrained in the highly absorbent microfine glass fiber separator material between the positive and negative plates and within the pores of the positive and negative active material of the plates.

Although electrolyte is immobilized and absorbed in special separators, the separators are not fully saturated so that the gasses evolved during charging or at other times can diffuse rapidly from one electrode to the other. Thus, in what is termed an "oxygen cycle," oxygen is produced at the positive electrode and diffuses to the negative electrode where it rapidly reacts to combine with active lead. Effectively, this reaction partially discharges the negative electrode, preventing the negative electrode from reaching its fully charged state, thereby minimizing the evolution of hydrogen. When the oxygen reacting at the negative electrode is equal to or greater than the rate of oxygen being produced at the positive electrode, water loss through electrolysis and, more importantly, pressure build up are minimized.

However, the oxygen cycle takes place only under the following conditions. First, both the positive and the negative plates must be in intimate contact with the separator material so that the entire surface of the plates has adequate electrolyte for its electrochemical requirements. Thus, it is of paramount importance that the cells be maintained under a compressive force to insure the necessary intimate contact between the plates and separators. Also, the oxygen initially produced at the positive plates must be contained in the cells under pressure (typically 0.5 to 8.0 psig) so that it contacts the negative plates to effect the oxygen cycle.

Unfortunately, the elevated internal pressures, necessary for the oxygen cycle, cause conventional containers to bulge, thus, causing a relaxation of the compressive force in the end cells. Consequently, the intimate surface contact between the separators and positive and negative plates in the end cells is reduced causing battery efficiency to be significantly reduced.

Sealed lead-acid batteries presently being produced attempt to nullify bulging through the use of stiffer materials less prone to bulge, stiffening ribs incorporated in the container end wall design, or thicker container end wall construction. While these approaches may offer some improvement, none of these techniques are entirely effective. Not only do such configurations increase the cost of manufacturing the batteries due to the higher cost of stiffer materials or using more of conventional materials, but they also increase the weight of the batteries, another important consideration in battery design.

SUMMARY OF THE INVENTION

It is an object of the present invention to provide an improved sealed lead-acid battery in which bulging of the container has no substantial effect on battery efficiency.

A more specific object is to provide a sealed lead acid battery incorporating means for insuring intimate contact between the electrodes and separators of the end cells, even when internal pressure causes the battery container to bulge.

It is a subsidiary object, in that regard, to maintain intimate contact between the electrodes and separators of the battery end cells without the need for substantial increases in the strength or stiffness of the materials which form the battery container.

BRIEF DESCRIPTION OF THE DRAWINGS

Other objects and advantages of the present invention will be seen from the following detailed description when taken in conjunction with the drawings, in which:

FIG. 2 is a partial plan view in section taken along the line 2—2 in FIG. 1;

FIG. 3 is a view similar to FIG. 2 illustrating an alternate embodiment of the invention;

FIG. 4 is a partial side view in section taken along line 4—4 of FIG. 3;

FIGS. 5 through 7 are partial views similar to FIG. 2 illustrating additional alternative embodiments of the invention; and FIGS. 8A through 8C illustrate a further alternative embodiment.

Figure 1:
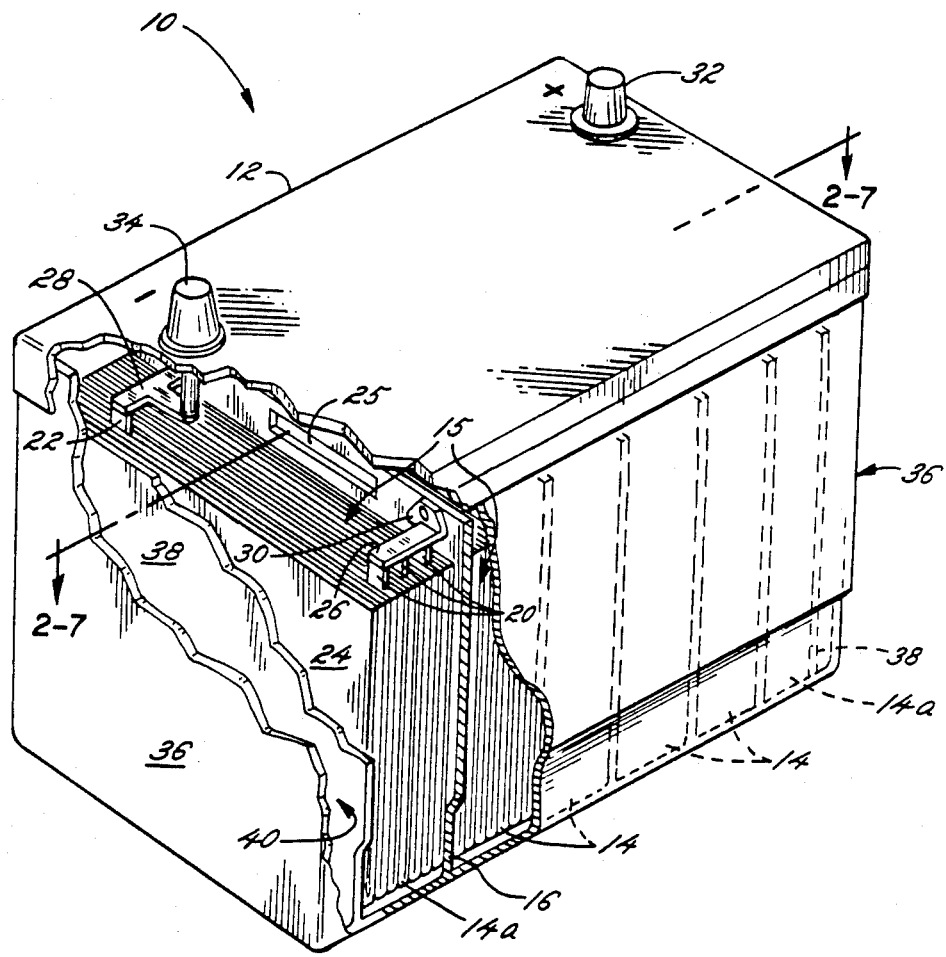
FIG. 1 is a perspective view of a battery made in accordance with the present invention, partially cut away to show the internal configuration.

While the invention is susceptible to various modifications and alternative constructions, certain illustrative embodiments have been shown in the drawings and will be described below in detail. It should be understood, however, that there is no intention to limit the invention to the specific forms disclosed, but on the contrary, the intention is to cover all modifications, alternative constructions and equivalents falling within the spirit and scope of the invention as defined by the appended claims.

DETAILED DESCRIPTION

Turning now to the drawings, FIG. 1 is a perspective view of a sealed lead-acid battery having a configuration, in accordance with the present invention, which maintains the intimate contact between the electrodes and separators during battery operation at or above atmospheric pressure, regardless of container bulging. The sealed lead-acid battery 10 has a rectangular shaped container 12. The container 12 is separated into individual intermediate working cells 14 and end working cells 14a by internal partition walls 16. As is conventional, each working cell 14 and 14a is made up of a plurality of positive electrode plates 20 and negative electrode plates 22 separated by absorbent separators 24 to form electrode stacks generally indicated at 15. The partition walls 16 have openings generally depicted at 25 to permit gasses evolved in the stacks 15 to diffuse throughout the battery 10.

The electrode plates can be connected by any of several techniques which are known in the art. The particular technique employed does not form a part of the present invention. As shown, in each working cell 14 and 14a, positive conductive straps 26 and negative conductive straps 28 connect the positive plates 20 and negative plates 22, respectively, within each cell 14 and 14a in parallel. The working cells 14 and 14a, in turn, are connected in series by at least one intercell connection 30 between the conductive straps 26 and 28 respectively. The respective positive and negative conductive straps in each of the end working cells 14a is a terminal conductive strap and is electrically connected to the positive battery terminal 32 and negative battery terminal 34, respectively.

As in typical sealed lead-acid batteries, there is substantially no free unabsorbed electrolyte in the cells 14 and 14a. The electrolyte is contained in the porous active material of the plates and the highly absorbent microfine glass fiber separators 24 located between the positive plates 20 and negative plates 22. Because the gasses that are evolved during charging and at other times must be able to diffuse rapidly from one electrode to the other, the separators 24 are not fully saturated. Thus, the oxygen evolved at the positive electrode 20 can diffuse to the negative electrode 22 to rapidly react with the active lead. The extent to which the separators 24 are saturated can vary and is dependent upon the capacity of the battery 10 which is in turn dependent upon the amount of electrolyte contained in the individual cells to produce a desired battery performance.

The oxygen cycle, in which the oxygen reacts with the active lead, partially discharges the negative electrode 22, thus preventing the negative electrode 22 from reaching its fully charged state. In effect, this oxygen cycle minimizes the evolution of hydrogen at the negative plates 22, and water loss through electrolysis, thus minimizing pressure buildup.

However, the proper operation of the oxygen cycle in a sealed lead acid battery takes place only under two conditions. First, both the positive plates 20 and the negative plates 22 must be in intimate contact with the separator 24 to insure that the entire surface of the positive plates 20 and negative plates 22 has adequate electrolyte for the desired electrochemical requirements. For this reason, it is of paramount importance that a compressive force be exerted on the electrode stacks 15 in cells 14 and 14a to insure that the necessary contact between the separators 24 and respective positive plates 20 and negative plates 22 is maintained.

Secondly, sealed lead-acid batteries operate at an elevated pressure (typically 0.5 to 8.0 psig) within the container 12 so that the oxygen, initially produced at the positive plates 20, contacts the negative plates 22 as it diffuses through the separators 24 and openings 25 in the partition walls 16.

In conventional sealed lead-acid batteries, the distance between the partition walls 16 is keyed to the thickness of the electrode stack 15 such that the stack closely fits within the cell 14 and 14a to achieve the desired compressive contact between the separators 24 and the respective plates 20, 22. However, the elevated internal pressures, in combination with additional pressure buildup due to the oxygen cycle, often results in a bulging of the container end walls 36. The bulging of the container 12 thus releases the compressive forces on the electrode stack within the end working cells 14a disposed at either end of the battery 10, causing separation of the positive plates 20 and negative plates 22 from the separator 24 thus, significantly reducing battery efficiency.

Even the use of stiffer materials less prone to bulging, stiffening ribs incorporated into the container's end wall, or even thicker container walls is not entirely effective in preventing such end wall bulging, with the resultant loss of the compressive forces upon the electrode stack, and adds to the cost of manufacturing and the weight of the battery 10 without eliminating the loss of efficiency due to such end wall bulging.

In accordance with the present invention, there is provided a novel battery container construction in which means are provided for accommodating end wall bulging while maintaining the necessary compression contact between the separators 24 and the respective positive and negative plates 20, 22 in the end working cells 14a. Such means are illustrated in the drawings as auxiliary cells 40 adapted to compensate for container bulging while maintaining the electrode stacks 15 within the end working cells 14a in intimate contact. The illustrated auxiliary cells 40 utilize two mechanisms for achieving their intended purpose. First of all, they provide a volume within the battery which contains no electrode stack 15, but is in communication with, and thus at the same pressure as, the working cells 14 and 14a. Thus, pressure changes within the battery can be accommodated, to a certain extent, in the gaseous volume within the auxiliary cells 40. Since the auxiliary cells 40 are at the same pressure as the working cells 14 and 14a, pressure changes do not bear upon the partition walls 16 forming the cells 14 and 14a, but instead, exert an expanding force on the battery end walls 36 which have been relieved, by the present construction, of their function of compressing the stacks 15 in the end working cells 14a. Secondly, the auxiliary cells 40 are provided with a compression means 38, supported by a portion of the battery container not prone to substantial bulging, and adapted to maintain a compressive force on the stacks 15 in the end working cells 14a. As a result, even if the pressure within the battery builds to the extent that the end walls 36 bulge, the pressure increase has no substantial effect on releasing the compressive forces within the end cells 14a, and the compression means 38 serves to doubly insure that the stacks 15 within those end cells 14a remain in the needed contact.

The bulge compensating auxiliary cells 40 have access to the gasses given off at the positive plates 20 and negative plates 22 in the working cells 14 and 14a because the compression means 38 is less than full container height as illustrated in FIGS. 1 and 2. Alternatively, the compression means 38 may be configured to have apertures (not shown) in the compression means 38, similar to the openings 25 in the partition walls 16, to permit gas pressures to equalize on both sides of the compression means 38. Thus, the auxiliary cells 40 are designed and configured to be always at the same pressure of the respective end working cell 14a. Subsequently, if the internal pressure causes bulging, bulging will occur in the end walls 36 only. The partition walls 16 separating the working cells 14 and 14a do not bulge, because such cells are uniformly at the internal pressure maintained within the battery 10. Thus, bulging will cause the container end walls 36 to bulge but will not affect the compression means 38 and the compressive forces on the working cells 14 and 14a. The unaffected compression means 38 will thus maintain the electrode stack under compression to insure that the positive plates 20 and negative plates 22 maintain intimate contact with the separators 24.

The bulge compensating auxiliary cells 40 need not be as wide as the working cells 14 and 14a. Ideally, the auxiliary cells 40 should be as small as possible since the exterior size of the battery 10 for most applications must remain constant and the addition of the nonworking auxiliary cells 40 reduces the volume available for the working cells 14 and 14a, thus, reducing the performance versus volume ratio for given exterior dimensions.

Since the only function of the compression means 38 is to maintain constant pressure on the plates 20, 22 and separators 24, of each end working cell electrode stack, the configuration of the compression means 38 may vary and need not be of full container height and width.

Alternate embodiments of the compression means 38 are shown in FIGS. 2 through 8. The cross hatched areas indicate the compression means 38, 38a, 38b, 38c and 38d. In all of these embodiments, when bulging occurs, causing the end wall 36 of the container 12 to deform, the compression means 38, 38a, 38b, 38c and 38d retains its shape and maintains the compression on the electrode stack in the respective end working cells 14a. In addition, the bulge compensating auxiliary cells 40 including the compression means 38 are accessible to and are subject to the same pressure as the gasses within the container 12, thus, maintaining a constant internal battery pressure which precludes any pressure differentiated across the compression means 38.

FIG. 1 and FIG. 2, which is a schematic top view of FIG. 1, show the compression means 38 specially molded as an integral part of the container floor and side walls. It is important to assure that the interior wall 38 is not molded or mechanically connected to the container end walls 36 or at least to the portion thereof which bulges. Additionally, it is seen that the height of the compression means 38a is less than the height of the container, allowing the internal gasses to have access to the bulge compensating auxiliary cell 40. On the other hand, if the compression means 38 is molded in the same manner as the partition walls 16, i.e. container wall-to-container wall, container floor-to-container cover, then means must be provided to equalize the gas pressure between the end working cell 14a and the bulge compensating auxiliary cell 40; one configuration for accomplishing such an end is to provide an aperture in the compression means 38, similar to the openings 25 in the partition wall 16.

FIGS. 3 and 4 present a top view and a side view, respectively, showing the compression means 38 molded as an integral part of the container floor but having no direct attachment to the container side walls.

In some cases it may be desirable, rather than molding the compression means 38 as an integral part of the container, to form them separately as auxiliary compression members and assemble them when constructing the battery. For example, the auxiliary compression members 38b, 38c, 38d, 38e and 38e' may be separately molded or otherwise fabricated and inserted into slots or other retaining members that are molded into the container 12. This offers the advantage that the auxiliary compression members 38b, 38c, 38d, 38e and 38e' could then be made of a thin, stiff material not normally adequate for battery container material. Additionally, it minimizes the reduction in working cell volume required by a molded type of construction. FIGS. 5 through 8 illustrate various embodiments of separately formed auxiliary compression members 38b, 38c, 38d, 38e and 38e'.

FIG. 5 shows an arcuate auxiliary compression member 38b while FIG. 6 shows a U-shaped auxiliary compression member 38c both of which may be easily inserted into the container 12 to maintain the working cells 14 in compression. Finally, FIG. 7 shows a relatively simple flat auxiliary compression member 38d which may be inserted into slots 42 or other types of retaining members that are molded into the container 12.

FIG. 8 shows a plan and two side views, of still another embodiment, in which auxiliary compression members or spacers 38e and 38e', having a bowed or some other suitable configuration, are inserted between the container end wall 36 and the electrode stack to hold the electrode stack under compression even under conditions of the end wall 36 bulging. The spacer 38e and 38e' may have a ribbed contact surface for maximizing gas diffusion to the surface of the negative end plate 22 at the spacer-stack interface. Bearing surfaces engage the end wall 36 at 42, adjacent to the floor and the cover, thus providing relatively fixed support surfaces for the spacer 38 and 38e' since container bulging occurs centrally of the end walls 36 while the junction with other walls remain relatively fixed.

I claim:

1. A sealed absorbed electrolyte battery comprising, in combination:

a sealed container divided into a plurality of working cells by internal partition walls;

each working cell containing an electrode stack comprising a plurality of positive and negative plates and a plurality of substantially porous separators intimately contacting and separating said positive and negative plates;

an electrolyte substantially completely absorbed in said plates and separators;

the working cells being dimensioned to hold the plates and separators within the working cell in contact with each other; and bulge compensating auxiliary cells for accommodating gas pressure changes within the battery without substantially deforming the working cells.

2. The battery as set forth in claim 1, wherein said bulge compensating auxiliary cells are gas containing cells interposed between an end working cell and an end wall of the battery container;

and means for connecting the working cells with the auxiliary cells to maintain substantially the same gas pressure in all said cells.

3. The battery as set forth in claim 1 wherein the auxiliary cells include compression means for maintaining the electrode stacks in the end working cells under compression.

4. The battery as set forth in claim 3, wherein one of the walls defining the bulge compensating auxiliary cells is the end wall of said battery container and the other wall defining the bulge compensating auxiliary cells is said compression means.

5. The battery as set forth in claim 4, wherein said compression means is molded as an integral part of the container.

6. The battery as set forth in claim 4, wherein said compression means is an auxiliary compression member inserted into the auxiliary cell for exerting a compressive force on the electrode stacks in the end working cell.

7. The battery as set forth in claim 6, wherein said auxiliary compression member comprises an insert positioned between the end wall of said container and said electrode stack.

8. The battery as set forth in claim 7, wherein said insert has a bowed configuration.

9. The battery as set forth in claim 7, wherein said insert has ribs located on the surface in contact with said electrode stack.

* * * * *